United States Patent [19]

Nassauer et al.

[11] Patent Number: 5,580,592
[45] Date of Patent: Dec. 3, 1996

[54] SPRAY DRYING OF ACID WHEY, ACID PERMEATE AND MIXTURES THEREOF

[75] Inventors: J. Nassauer, Langenbach; R. Fritsch, Munich; A. Gotzmann, Kempten; J. Dollmann, Fallingbostel, all of Germany

[73] Assignee: Kraft General Foods R & D Inc., Northfield, Ill.

[21] Appl. No.: 269,948

[22] Filed: Jun. 30, 1994

Related U.S. Application Data

[63] Continuation of Ser. No. 45,845, Apr. 9, 1993, abandoned.

[51] Int. Cl.$^6$ ........................................ A23B 7/026
[52] U.S. Cl. .............. 426/96; 426/97; 426/443; 426/471; 426/580; 426/583; 426/588; 159/48.1
[58] Field of Search .................. 426/96, 97, 580, 426/583, 588, 443, 471; 159/48.1

[56] References Cited

U.S. PATENT DOCUMENTS

| | | | |
|---|---|---|---|
| 2,661,294 | 12/1953 | Meade | 426/471 |
| 3,121,639 | 2/1964 | Bauer et al. | 426/585 |
| 3,615,663 | 10/1971 | Becker . | |
| 3,615,664 | 10/1971 | Francis | 426/239 |
| 3,840,996 | 10/1974 | Grindstaff . | |
| 4,057,655 | 11/1977 | Okada et al. | 426/583 |
| 4,088,791 | 5/1978 | Jones | 426/99 |
| 4,160,041 | 7/1979 | Schroeder et al. | 426/69 |

FOREIGN PATENT DOCUMENTS

| | | | |
|---|---|---|---|
| 2212101 | 7/1974 | France | A23C 21/10 |

OTHER PUBLICATIONS

Modler, H. et al. "Calcium as an Adjuvant for Spray–Drying Acid Whey" JL. Dairy Science, vol. 61 (3) 1978. pp. 294–299.
Database WPI Derwent Publications, Ltd., Week 7708, 1976 London, GB; SU A–488578 Butter Cheese Ind.
Yagi et al., JP 62-303488, Jun. 1989, abstract only.
Fennema, O. R., Food Chemistry, 1985, pp. 665–666, Marcel–Dekker, Inc. (New York).

*Primary Examiner*—Helen Pratt
*Attorney, Agent, or Firm*—Thomas A. Marcoux; Thomas R. Savoie

[57] ABSTRACT

An improved process for spray drying is provided for the acid type of cheese whey or casein whey, partially delactosed acid whey or a permeate obtained by ultrafiltration of acid cheese milk/or acid whey accomplished by injecting a dry neutralizing edible calcium or magnesium salt during the spray drying.

4 Claims, No Drawings

SPRAY DRYING OF ACID WHEY, ACID PERMEATE AND MIXTURES THEREOF

This application is a continuation of application Ser. No. 08/045,845, filed Apr. 9, 1993.

BACKGROUND OF THE INVENTION

1. Field of the Invention

The present invention relates to an improved process for drying of acid whey and/or acid whey permeate. More particularly, the present invention relates to a process for spray drying the acid type of cheese whey or casein, partially delactosed acid whey or an acid permeate obtained by ultrafiltration of acid whey and/or acid cheese milk. This is accomplished by injecting a dry neutralizing edible calcium or magnesium salt during the spray drying of the acid whey and/or permeate products and drying the resulting product.

2. Description of the Prior Art

It is well known that the spray drying technology leads to severe clogging of the spray tower and the associated cyclone if acid whey and/or acid permeate are spray dried. This situation results in very short running times and therefore, makes it impossible to handle the increasing amount of acid whey and/or acid permeate resulting from fresh cheese production. The fouling and clogging within the spray tower can be partly reduced by adding approximately 30 to 40% by weight of sweet whey to the acid mix or adding a lesser amount of sweet whey with an inert anti-caking agent. Other methods used include U.S. Pat. No. 3,615,664 issued Oct. 26, 1971, which utilizes a process for demineralization of a high heat treated delactosed whey and also provides whey processing steps to improve drying characteristics of the material. This is accomplished by crystallizing the liquid whey product and removing the lactose crystals. The resulting whey is clarified and adjusted to a pH of 3.9 to 4.2 for cheddar cheese whey and 4.65 to 6.5 for sweet whey, subjecting the clarified whey to electrodialysis, concentrating the electrodialyzed material and spray drying the resulting product. U.S. Pat. No. 4,057,655, issued Nov. 8, 1977, describes a process for preparing a free flowing lactulose-containing powder from whey solutions or permeates by adding calcium hydroxide to adjust the pH to 9.4 to 11.2, heating the solution to reduce the pH to 7.5 to 9, then homogenizing, concentrating and drying the resultant product. This patent refers to the use of calcium hydroxide for conversion of lactose into lactulose. U.S. Pat. No. 4,088,791, issued May 9, 1978, describes a process for making a free flowing modified whey powder by forming an emulsion of titanium dioxide, fat and water, neutralizing (pH 6.7 to 7.4) the emulsion and adding the emulsion to a concentrated whey and spray drying the product. The neutralization step is accomplished by the addition of calcium lactate or a combination of calcium carbonate or calcium hydroxide, aluminum hydroxide and magnesium carbonate.

SUMMARY OF THE INVENTION

The process of the present invention is an improved process for spray drying a dairy product selected from the group consisting of acid whey, acid whey permeate and cheese milk permeate and mixtures thereof, said permeates containing crystallized lactose, by feeding the acid whey and/or acid permeate into a spray-dryer and injecting a dry neutralizing edible calcium salt or magnesium salt into the spray tower and drying the resultant product. This process is a simple process without the need of using multiple steps, does not require the addition of a sweet whey or sweet permeate (although small amounts of sweet whey or sweet permeate can be present) and the spray drying process can be conducted for extended periods of time without logging and fouling of the tower.

DETAILED DESCRIPTION OF INVENTION

The raw material used in the present invention is a by-product solution from dairy plants predominantly containing lactose. The by-product solution includes whey from the manufacture of cheese such as cottage cheese, cream cheese and the like, known in the industry as acid whey, which is difficult to crystallize and even when crystallized, is difficult to dry into a nonsticky, free flowing powder. It also includes the ultrafiltration permeates from acid cheese milks and/or whey.

So troublesome is the drying of acid whey and/or dairy permeates that most producers of cottage cheese and cream cheese do not even attempt to dry their whey. It is simply disposed of in a waste water treatment system or hauled away, sometimes concentrating it to reduce its volume before hauling.

Ordinary whey is classified according to its lactic acid content into the categories of acid whey having a titratable acidity not less than 0.40% and sweet whey having a titratable acidity of not greater than 0.16%. In this invention the acid whey can be of the type obtained from cheese or casein, partially delactosed acid whey or permeate obtained by ultrafiltration of acid whey and/or acid (synthetic cultures sour) cheese milk.

Prior to feeding the acid whey and/or acid permeate into the spray dryer, these materials are concentrated by evaporation to about 45 to about 60% solids forming a paste-like material. This paste-like material is stored for a period of time to allow the crystallization of most of the lactose. The resulting paste is fed into the spray dryer maintained at temperatures in the range from about 110° C. to about 200° C. to produce a dry powder leaving the spray tower having a moisture content of about 10 to about 30% by weight. A subsequent heating step is provided to dry the powder to levels from about 2 to about 5 weight % moisture. The essential element to this invention is during the drying procedure, a dry neutralizing edible calcium or magnesium salt is injected into the spray dryer blending with the acid whey and/or acid permeate in amounts from about 0.5 to about 10% by weight, preferably 8.5% to about 5% by weight of the total contents of the finished product. The amount of the dry neutralizing edible calcium or magnesium salt results in a pH of the final water dissolved whey or permeate powder in the range from about 5.8 to about 7.0.

The dry neutralizing edible calcium and/or magnesium salts which-can be used in this invention are calcium hydroxide, calcium carbonate, calcium oxide, magnesium hydroxide, magnesium carbonate, magnesium oxide among others.

The significant advantage of this invention is that the injection of the dry neutralizing edible calcium salt into the spray dryer with the acid whey and/or acid permeate containing crystallized lactose, provides a process which is substantially free of clogging and fouling of spray tower and the associated cyclone over extended periods of time for as long as 4 to 5 days or longer.

Utilizing the claimed invention provides a highly desirable spray drying technique for acid permeate from ultrafiltered acid cheese milks or ultrafiltered acid whey which heretofore spray drying of these products was extremely difficult and, in some instances, not possible at all.

The following examples are provided to further illustrate the invention.

EXAMPLE 1

A mixture of 50% weight percent of acid whey and 50 weight percent acid permeate was concentrated to a dry matter of 52.3% (the pH was 4.37) and stored for one day at a temperature of 24° C. The resulting concentrate with partially crystallized lactose was fed into a spray dryer at a flow rate of 1500 liters per hour. The air inlet temperature of the spray dryer was 130° C. and the outlet temperature was 53° C. Dry calcium hydroxide, transported by air into the tower, was fed in at a concentration of about 1.3 weight percent of the finished spray dried product. The spray nozzle for the calcium hydroxide was mounted about 1.5 meters under the spraying disc to allow a homogeneous coating of the droplets of the material to be dried. The product then falls into a drum dryer having an inlet temperature of the air of 178° C. and an outlet temperature of 101° C. The compositional analysis of the finished product showed the following data:

| | |
|---|---|
| Total Solids | 97.8% |
| pH Value (7 g in 100 ml) | 6.15 |
| Fat | 1.9% |
| Protein | 5.16% |
| Nacl | 2.69% |
| Lactose | 64.8% |
| Calcium | 2.6% |
| Lactic Acid | 9.73% |
| Ash | 13.0% |

Additional trials were conducted neutralizing the acid whey or the acid concentrate prior to spray drying by adding sodium hydroxide and separately calcium hydroxide to the liquid phase to increase the pH from 4.2 to 5.8. During the spray drying, severe clogging within an hour of the tower was observed with both the calcium hydroxide and sodium hydroxide addition to the whey.

In a similar manner, the injection of dry sodium hydroxide into the spray tower did not provide any significant improvement. Also the injection of an aqueous solution of calcium hydroxide to the liquid whey or permeate or its concentrate during spray drying did not provide any improvements compared to the present invention.

Consequently the direct injection of dry, powdered neutralizing edible calcium or magnesium salts into the spray dryer is a key element of the present invention. It provides the optimal reaction conditions to obtain a free-flowing powder. The injection of dry powdered neutralizing calcium salts is believed to instantaneously generate a large internal surface by coating the spray dry ingredients and leads to a general reduction of the water concentration at the surface. This allows optimal and effective crystallization of the lactose into agglomerated particles without clogging. It is further believed that the addition of the dry powdered neutralizing calcium or magnesium salts into the acid whey and/or acid permeate improves the kinetic conditions to achieve an almost complete precipitation of the organic acids such as the insoluble calcium salts of lactic acid, phosphoric acid, citric acid and the like.

Another effect of the direct powder injection is to keep the heat- and alkali-induced deterioration reactions to a minimum, e.g., formation of lactulose, because of minimum exposure to heat and alkali.

The advantages of this spray drying technology of this invention are as follows:

spray drying of pure acid whey and/or pure acid permeate without the need for availability of sweet whey excellent solubility of the finished whey or permeate powder safe handling of the dry calcium salts (compared to aqueous calcium salt solutions).

What is claimed is:

1. An improved process for spray-drying a dairy product selected from the group consisting of acid whey, acid whey permeate, acid cheese milk permeate, and mixtures thereof, said products containing crystallized lactose, said improved process consisting essentially of the following steps:

(1) concentrating said dairy product by evaporation to about 45% to about 60% by weight solids;

(2) storing said dairy product of step (1) to allow for the crystallization of most of the lactose;

(3) feeding said dairy product of step (2) into a spray tower for spray-drying and, during said spray-drying, injecting into said spray tower about 0.5% to about 10% by weight of the finished product, a dry, powdered neutralizing edible salt selected from the group consisting of calcium hydroxide, calcium carbonate, calcium oxide, magnesium hydroxide, magnesium carbonate, magnesium oxide and mixtures thereof;

(4) blending and producing a homogeneous coating of the dairy product of step 3 to be dried; and (5) drying the resulting product.

2. The process of claim 1 wherein about 0.5% to about 5% by weight of said dry neutralizing edible salt is injected into said spray dryer.

3. The process of claim 1 wherein said dry, powdered neutralizing edible salt is calcium hydroxide.

4. The process of claim 2 wherein said dry, powdered neutralizing edible salt is calcium hydroxide.

\* \* \* \* \*